United States Patent Office 2,768,217
Patented Oct. 23, 1956

2,768,217

2- AND 4-METHYL-5-NITRO-α¹,α³-XYLYLENE DICHLORIDES AND THEIR PREPARATION

Saul R. Buc, Easton, Pa., assignor to General Aniline & Film Corporation, New York, N. Y., a corporation of Delaware No Drawing. Application March 20, 1952,
Serial No. 277,740

6 Claims. (Cl. 260—646)

This invention relates to new compounds which may be represented by the following formula:

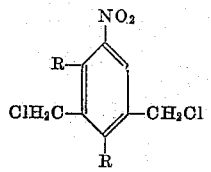

wherein one R is hydrogen and the other R is a methyl group, and to their preparation by reacting the corresponding nitrotoluene with substantially pure bischloromethyl ether in the presence of 85 to 100% sulfuric acid.

These compounds are useful for the preparation of substituted anthraquinone dyes; for instance, by converting the chloromethyl groups to the corresponding methylol groups, reducing the nitro group to an amino group, and then condensing in the presence of an acid catalyst with an anthraquinone compound to prepare the dyes, such as those disclosed in U. S. Patent No. 2,560,887.

It has been proposed heretofore to nitrate para-dichloromethyl benzene; and the resulting compounds contain at least one chloromethyl group which is ortho to the nitro group. Upon converting the chloromethyl groups to methylol groups, and reducing the nitro group to the amino group, and then condensing with an acid catalyst, these compounds undergo polymerization to give a gummy material, and thus are not suitable for the preparation of substituted anthraquinone dyes in the above-discussed manner. It has been indicated heretofore that in the reaction of a crude bischloromethyl ether with aromatic compounds, the use of about 85 to 100% sulfuric acid should be avoided, since the presence of this acid results in the formation of large quantities of undesirable diphenylmethane type by-products. It has also been indicated heretofore that such a reaction may be carried out in the presence of oleum; however, in actual tests it has been found that the reaction does not proceed when substantially pure bischloromethyl ether is used in the presence of oleum.

It has been found in accordance with the invention that 2- and 4-methyl-5-nitro-α¹,α³-xylylene dichlorides (methyl-chloro-methyl-meta-nitro-benzyl chloride) may be prepared in a convenient manner with very good yields by reacting the corresponding nitro-toluene with substantially pure bischloromethyl ether in the presence of 85 to 100% sulfuric acid.

The objects achieved in accordance with the invention as described herein include the provision of an advantageous manner of producing 2- and 4-methyl-5-nitro-α¹,α³-xylylene dichlorides by reacting the corresponding nitrotoluene with substantially pure bischloromethyl ether in the presence of oleum-free sulfuric acid; the provision of new 2- and 4-methyl-5-nitro-α¹,α³-xylylene dichlorides; and other objects which will be apparent as details or embodiments of the invention are set forth hereinafter.

In order to facilitate a clear understanding of the invention, the following preferred specific embodiments are described in detail:

Example 1

In a suitable reaction vessel, the following mixture was prepared:

685 parts by weight of para-nitrotoluene
722 parts of substantially pure bischloromethyl ether
2210 parts of 100% sulfuric acid The mixture was maintained at 55–65° C. for 40 hours. The heavy crystalline precipitate which formed was filtered off, washed with sulfuric acid and then washed acid-free with water, and dried. A 73% of theoretical yield was obtained of a product melting at 143–146° C. The product was dissolved in toluene, the solution clarified with a little charcoal, and the product recrystallized therefrom melted at 149–150° C. This product is

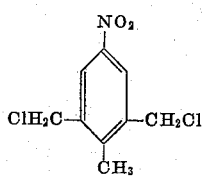

Example 2

Following the above procedure, the following mixture:

1080 parts by weight of 96% sulfuric acid
138 parts of ortho-nitrotoluene
144 parts of bischloromethyl ether was maintained at 45° C. for 35 hours. The liquor was separated from the solid precipitate, and this liquor was drowned in crushed ice, and then extracted with benzene. The benzene solution was washed free of acid, dried, and distilled in high vacuum. The crystalline distillate was recrystallized from methanol, and the product melted at 83–85° C. This product is

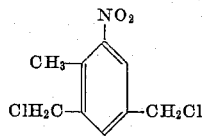

Comparable results to the foregoing are obtained by variations such as the following: About 1 mol of the nitrotoluene is reacted with about 1 mol of the substantially pure bischloromethyl ether, the oleum-free sulfuric acid is desirably of 85 to 100% strength, and preferably about 95 to 100%. The reaction temperature is in the range of 25 to 75° C., the reaction time is in the range of 24 to 130 hours, and the amount of the acid is in the range of about 1 to 15 times the weight of the bischloromethyl ether. Generally, higher acid concentrations and higher reaction temperatures are reflected in shorter reaction times.

It is indeed surprising that the new compounds described herein may be prepared in good yields by the above-described methods, especially in view of prior literature which indicates that the particular sulfuric acid agent used should be avoided.

This application is a continuation-in-part of application Serial No. 128,917, filed November 22, 1949, now abandoned.

In view of the foregoing disclosures, variations and modifications of the invention will be apparent to one skilled in the art, and it is intended to include within the invention all such variations and modifications except as do not come within the scope of the appended claims.

I claim:
1. A process for preparing a compound having the formula:

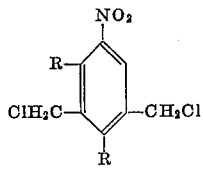

wherein one R is hydrogen and the other R is a methyl group which comprises reacting one mol of the corresponding nitrotoluene with about one mol of substantially pure bischloromethyl ether in the presence of an acid consisting of 85 to 100% sulfuric acid at a temperature in the range of 25 to 75° C. and a time in the range of 24 to 130 hours, the amount of the acid being in the range of 1 to about 15 times the weight of the ether.

2. A method of claim 1 wherein para-nitrotoluene is reacted.

3. A method of claim 1 wherein ortho-nitrotoluene is reacted.

4. A composition having the formula:

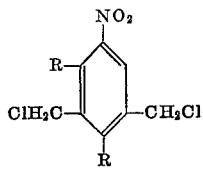

wherein one R is hydrogen and the other R is a methyl group.

5. A compound having the formula:

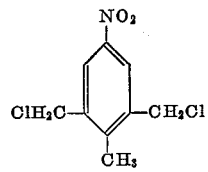

6. A compound having the formula:

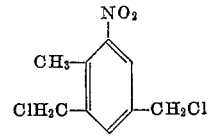

References Cited in the file of this patent

Jour. Chem. Soc. (London), 1920, pp. 510–527 (article by Stephen et al.).

Comptes Rendus, vol. 73, p. 1385 (1871) (article by Grimaux).